(12) United States Patent
Mostala

(10) Patent No.: US 6,755,216 B1
(45) Date of Patent: Jun. 29, 2004

(54) METHOD OF REPAIRING AN UN-ISOLATABLE LEAK IN A PIPING SYSTEM AND APPARATUS AND COMPONENTS FOR ACCOMPLISHING THE SAME

(76) Inventor: Abbas Mostala, P.O. Box 968, MD PE 24, Richland, WA (US) 99352

( * ) Notice: Subject to any disclaimer, the term of this patent is extended or adjusted under 35 U.S.C. 154(b) by 146 days.

(21) Appl. No.: 10/086,812

(22) Filed: Feb. 28, 2002

(51) Int. Cl.$^7$ .............................................. F16L 55/18
(52) U.S. Cl. .............................. 138/98; 138/92; 138/94
(58) Field of Search .............................. 138/98, 97, 92, 138/94

(56) References Cited

U.S. PATENT DOCUMENTS

| | | |
|---|---|---|
| 1,083,024 A | 12/1913 | Morris |
| 1,850,040 A | 3/1932 | Turner |
| 2,141,274 A | 12/1938 | Lenhart |
| 2,170,866 A | 8/1939 | McAllister |
| 2,176,260 A | 10/1939 | Johnson |
| 2,621,679 A | 12/1952 | Tuttle |
| 2,690,612 A | 10/1954 | Scott |
| 3,237,638 A | * 3/1966 | Rothenberg ................. 137/319 |
| 3,814,276 A | * 6/1974 | Van Gorden et al. .... 220/259.4 |
| 3,918,748 A | * 11/1975 | Acda ......................... 285/21.3 |
| 4,127,141 A | 11/1978 | Ledonne et al. |
| 4,153,067 A | * 5/1979 | Ray ......................... 137/15.12 |
| 4,249,577 A | 2/1981 | Davis |
| 5,038,818 A | 8/1991 | Jiles |
| 5,363,881 A | 11/1994 | Larkin |
| 5,590,676 A | 1/1997 | Wagner |
| 5,884,668 A | 3/1999 | Larkin |
| 6,116,285 A | 9/2000 | Wilson |

* cited by examiner

Primary Examiner—James Hook
(74) Attorney, Agent, or Firm—Robert B. Hughes; Hughes Law Firm, PLLC

(57) ABSTRACT

A method of repairing a leak at a branch pipe location in a manner that it is not necessary to drain the water or the liquid from the main pipe at which the repair is being made. The end of the existing branch pipe is removed from a connector at the main pipe, and a temporary plug with an elongate handle is used to branch the connector opening. With the opening remaining closed, an intermediate connector is placed over the elongate handle and welded to the connector, after which the plug member is taken from the opening and a permanent plug put in the upper end of the intermediate connector.

17 Claims, 6 Drawing Sheets

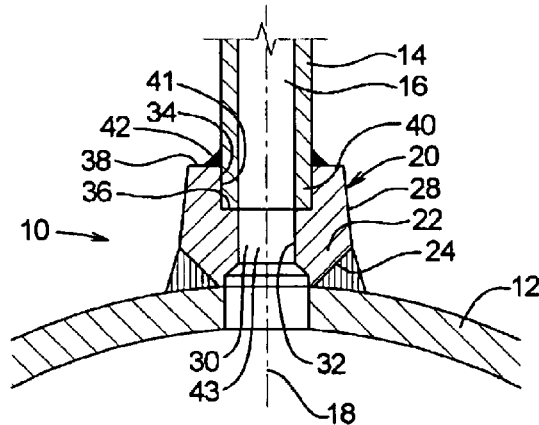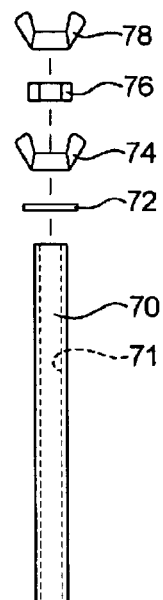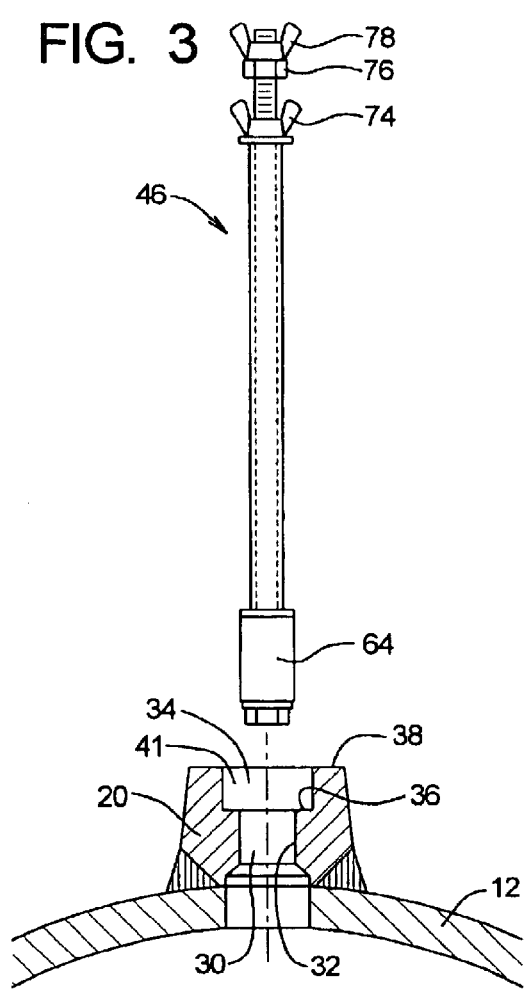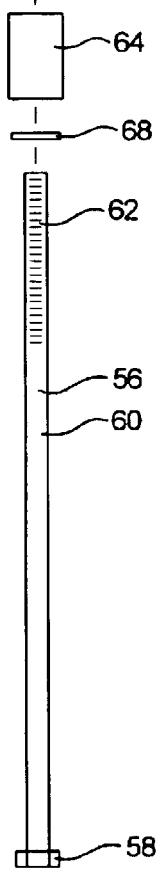

FIG. 11
FIG. 12
FIG. 13
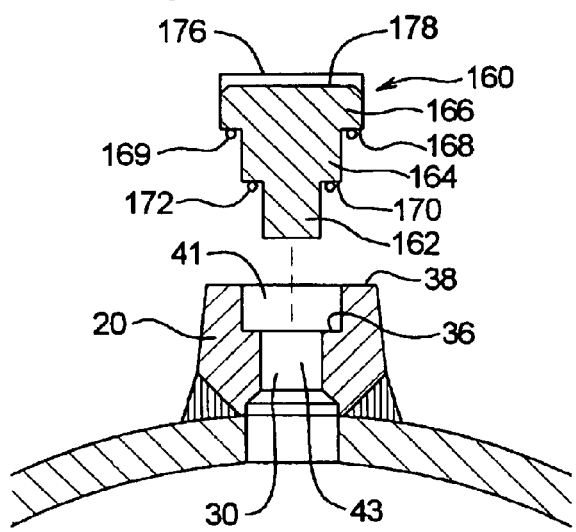
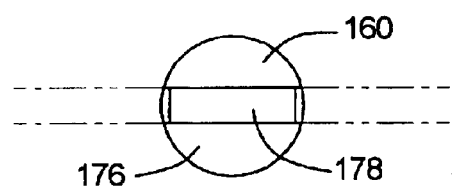
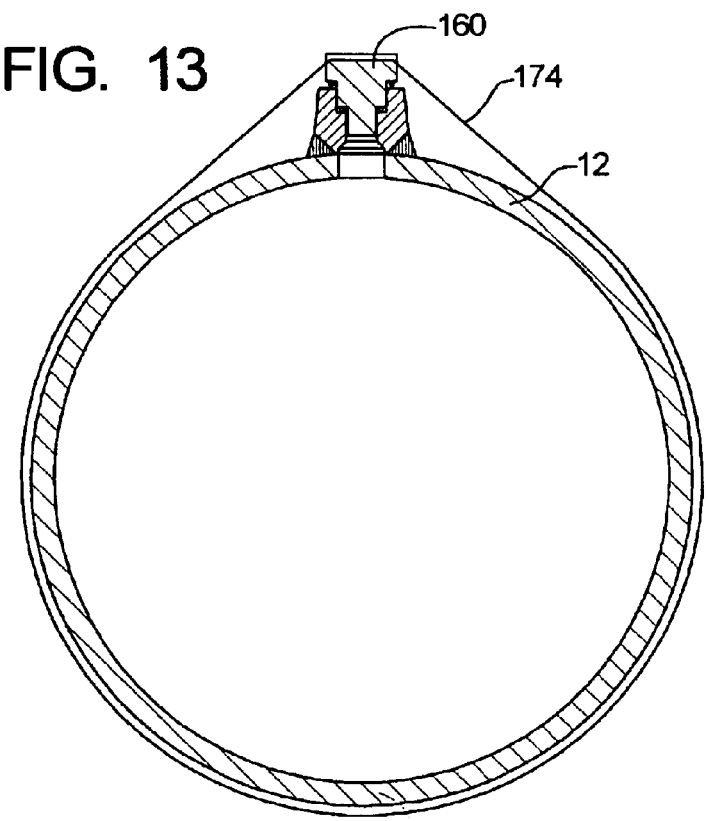

METHOD OF REPAIRING AN UN-ISOLATABLE LEAK IN A PIPING SYSTEM AND APPARATUS AND COMPONENTS FOR ACCOMPLISHING THE SAME

BACKGROUND OF THE INVENTION a) Field of the Invention

The present invention relates to the repair of a leak in a piping system, and more particularly a method for repairing a leak at a connection of a branch pipe to a main pipe. The present invention relates to the apparatus and components for making such a repair, and also relates to the repair structure itself that is made in accordance with the present invention.

b) Background Invention

There are various industrial environments where there exists a pipe system with one or more main pipes and a plurality of branch pipes connected thereto. One of the more vulnerable connections which can experience the formation of a leak or leaks is where a branch pipe connects to a main pipe, and particularly where there is a socket welded connection.

In the nuclear power industry pipe systems are used for the circulation of liquid (i.e. water), and branch connections are normally used for piping vent and drain connections, as well as instrumentation connections. The socket welded connection is often made by a branch fitting, such as a sockolet, half-coupling, or pipet. Typical connections are branch pipes having, for example, one inch or a three quarter to one inch nominal pipe size. Quite often the failures that lead to the leak are due to fatigue of the socket welded connections. Once a crack is initiated in a weld or pipe, normal plant steady state vibrations can drive the crack through the wall of the fittings and/or pipe.

Typically, in the prior art, for the repair to be made to the leak, it is necessary that the system be isolated and a shutdown is required to make the repair. If the large pipe system cannot be isolated due to either leaking valves or there being no isolation capability, a repair becomes extremely difficult. In water systems, a freeze seal can be used to provide proper isolation. However, freeze seals are difficult and take a significant period of time to establish large bore piping. Thus, in some cases freeze seals are impractical.

A search of the patent literature has revealed a number of U.S. patents, and these are discussed below.

U.S. Pat. No. 6,116,285 (Wilson) shows a pipe plug that is screwed into a nipple secured to the side of a pipe.

U.S. Pat. No. 5,884,668 (Larkin) shows a plumbing tool for temporarily plugging a pipe, and particularly for plugging water pipes, gas pipes and the like, which normally contain fluid or gas under pressure. In column 1, the patent discusses the problem that when a pipe is wet it is impossible to obtain a watertight solder joint. To alleviate this problem, this device permits the temporary plugging of a water pipe where the plug can be inserted through the bore of a plumbing valve to plug the pipe, so as to permit the valve to be de-soldered from the pipe and removed and replaced while the plug is in its position blocking the flow of water or gas in the pipe. There is an expandable gasket 21, which is positioned between a lower washer 15 and an upper washer 13. By manipulating the two nuts 11 and 23, the sleeve 9 is pressed downwardly against the washer 13 to compress, and thus expand, the expandable gasket 21. As shown in FIGS. 3 and 4, this tool can be inserted through the valve and downwardly into a location to plug the pipe.

U.S. Pat. No. 5,590,676 (Wagner) shows a system for the installation of a permanent stopper or plug to prevent the escape of gas under pressure from a pipe. FIG. 1 shows a preliminary step for a tapping machine (designated "T") to be inserted through an existing gate valve V to drill the hole in the pipe P to ensure that the hole is round. After this is done, the tapping tool T is removed, and the gate valve closed. Then the apparatus 10, is utilized to insert the permanent plug.

U.S. Pat. No. 5,363,881 (Larkin) shows an expanding pipe plugging device in which a threaded nut and rod are used to compress and expand the locking element.

U.S. Pat. No. 5,038,818 (Jiles) shows an apparatus to repair a leak in a gas pipe. This is accomplished by mounting two fixtures 200 on opposite sides of the leak 101 in the pipe. The next step is to drill two holes at the location of each fixture 200. At this point, the bypass of the gas flowing in the pipe travels through the line 107, and now the repair of the leak 101 can take place. With that accomplished, the next task is to provide a permanent plug for the two openings that have been drilled. The first method is shown in FIGS. 18 through 22. There is the elastomeric plug 843 which is pressed between upper and lower compression plates 845 and 847 to form the seal. In an alternative procedure, after the fixtures 200 are removed, the polyethylene caps may be screwed or fused onto the branching saddle pipe stubs 113 to provide a backup seal. The alternative method for insertion of the completion plug assembly 900 is illustrated in FIGS. 23 and 24.

U.S. Pat. No. 4,127,141 (Ledonne et al) shows a means for closing off a fluid pressure carrying pipe while repairs are being made. There is a valve secured to the opening being repaired through which an expansion element is passed and expanded to obstruct the side wall opening in the pipe, so there's no loss while repairs are carried out.

U.S. Pat. No. 4,249,577 (Davis) shows a method for sealing gas lines. The sequence of steps is shown in FIGS. 6 through 16. As shown in FIGS. 8 and 9, a temporary plug is installed. In FIGS. 11 through 16, there are shown the steps by which a permanent plug can be placed in the opening and welded.

U.S. Pat. No. 2,690,612 (Scott) shows a means for accessing the interior of a pressure or vacuum vessel by passing a threaded rod and nut locking means through a gate valve into an opening that is to be closed.

U.S. Pat. No. 2,621,679 (Tuttle) shows a method and means for attaching a test plug to a pipe end. There are mechanical means to secure the test plug to the outside of the pipe and expanding elements 36, and 38, which seal against the inside of the pipe so test pressure may be applied.

U.S. Pat. No. 2,176,260 (Johnson) shows a means for obstructing an outlet by means of an expandable rubber plug for obstructing an outlet from a water main so that a service line may be worked on.

U.S. Pat. No. 2,170,866 (McAllister) shows a generic expansion stopper for use with pipes, tanks or the like.

U.S. Pat. No. 2,141,274 Lenhart) shows a means for blocking a pipe so that valves or other fitments may be repaired.

U.S. Pat. No. 1,850,040 (Turner) shows a plugging element 6 that is compressed within a service line to prevent access to the gas service line.

U.S. Pat. No. 1,083,024 (Morris) shows a plug carrying saddle fitting that is secured to a pipe, for access to the pipe.

SUMMARY OF THE INVENTION

The method, system, apparatus and components of the present invention are particularly designed for repairing a leak in a pipe assembly which comprises a main pipe with a main pipe wall having a main pipe connecting portion with a through opening and a branch connecting to the main pipe at the through opening.

The present invention is designed to enable the repair to be made without the necessity of draining the water or other liquid from the main pipe at which the repair is being made. Further, the present invention enables the repair to be made with either a permanent plug shutting off the branch opening or making a connection to the same branch pipe, or another branch pipe. This can be done in a manner so that the repair structure meets the strictest standards (ASME: American Society of Mechanical Engineers, and ANSI: American National Standard Institute) relative to durability and resistance to development of cracks due to the fatigue or application of exterior forces.

In the method of the present invention, the first step is to separate the branch pipe from the main pipe. Then a plugging tool is provided with a plug portion and a plugging tool extension. The plug portion of the tool is inserted into the through opening of the main pipe, with the plugging tool extension extending outwardly from the main pipe. This provides blockage of the fluid flow from the opening.

There is provided an intermediate connecting section which has a through passageway and a connecting end portion. The intermediate connecting section is positioned so that the plugging tool extension is located in the through passageway of the intermediate connecting section.

The connecting end portion of the intermediate connection section is then joined (e.g. by welding) to the connecting portion of the main pipe desirably by inserting the connecting end portion at least partly into the through opening of the connecting portion of the main pipe. After this, the plug portion is removed from the through opening of the connecting portion by withdrawing the plugging tool extension with the plug portion, after which a closure member is used to close the through passageway of the intermediate connection section.

In a preferred embodiment, the plug member is inserted into the through opening of the connecting portion, and the extension member is manipulated to expand the plug member in the through opening of the connecting portion to form a fluid type seal. Subsequently, the extension member is manipulated to collapse the plug portion to then withdraw the plug portion from the through opening.

Also in a preferred form, the connecting end portion of the intermediate connecting section is placed in interfitting relationship with the connecting portion by inserting the connecting end portion at least partly into the through opening of the main pipe connecting portion of the main pipe.

More specifically, the through opening of the main pipe connecting portion comprises a first opening portion of a smaller diameter closer to a center location of the main pipe, and a second larger diameter opening portion positioned further from the center location of the main pipe. The method further comprises inserting the plug member into the first opening portion of the through opening, and positioning the connecting end portion of the intermediate connecting section into the second opening portion of said through opening of the connecting portion.

In a preferred form, the connecting portion of the main pipe has an annular surface portion facing generally outwardly from the center location of the main pipe and surrounding the second larger diameter opening portion. The method further comprises applying a bonding agent at a circumferential location of the annular surface portion and at an adjacent surrounding surface portion of the connecting end portion of the intermediate connecting section. In a preferred embodiment, the bonding agent is a weld material which is applied circumferentially to the annular surface portion and also to the adjacent surface portion and the connecting end portion.

The intermediate connecting portion has a second connecting end portion and a central connecting portion located between the connecting end portion and the second connecting end portion. The connecting end portion has a wall thickness of a first smaller thickness dimension and said central intermediate connecting portion has a wall thickness of a greater thickness dimension at a location adjacent to the annular surface portion. The annular surface and an adjacent portion of the central portion connecting portion form a circumferential recess in which the bonding agent is placed.

Further, in the method of the present invention, the plug member is removed from the through opening of the main pipe section and outwardly through the through passageway of the intermediate connecting section. The method further comprising placing a closure plug in the through passageway at the second end portion of the intermediate connecting section to block liquid flow through the passageway of the intermediate connecting section. More specifically, the second end portion of the intermediate connecting section has a generally cylindrical outer end recess to receive the closure plug, and the closure plug has a threaded connection in the recess. Desirably the second end portion of the intermediate connecting section has an outer annular recess surrounding the outer end recess of the second end portion, and the outer annular surface faces outwardly from a center location of the main pipe. The closure plug extends outwardly beyond the outer annular surface as an outer generally cylindrical closure portion. The method further comprises applying a bonding material to the outer annular surface and also to an adjacent portion of the outer generally cylindrical closure portion. Desirably the bonding agent is a weld material.

Also in a preferred form the threaded portion of the cylindrical recess is spaced toward the center location of the main pipe from the outer annular surface of the second end portion so that there is a substantially flat cylindrical surface portion of the recess at the second end portion which is adjacent to the outer annular surface surrounding the recess of the second end portion, and extending therefrom to said threaded connecting portion.

Other features of the present invention will become apparent from the following detailed description.

BRIEF DESCRIPTION OF THE DRAWINGS

FIG. 1 is a sectional view illustrating a portion of a main pipe and a branch pipe connected thereto in a typical prior art arrangement;

FIG. 2 is an exploded view of the plugging tool utilized in the method of the present invention;

FIG. 3 illustrates the plugging tool (in its assembled form) in a position to be inserted into the connector opening in accordance with the method of the present invention;

FIG. 11 is a sectional view of the main pipe, as shown in FIG. 1, with a temporary plug inserted into the opening of the connecting member;

FIG. 12 is a top plan view of a plug shown in FIG. 11; and

FIG. 13 is a sectional view taken across the main pipe showing the plug of FIGS. 11 and 12 held in place in its plugging position;

DETAILED DESCRIPTION OF THE PREFERRED EMBODIMENT

Figure 4:
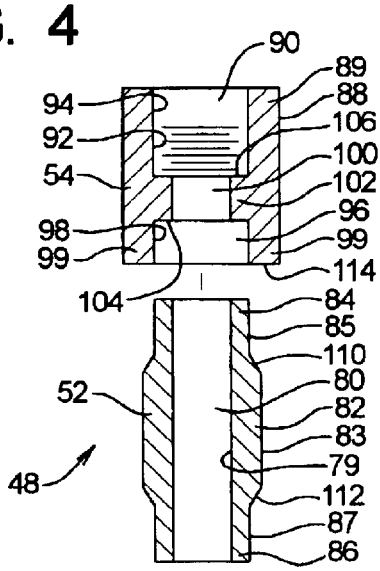
FIG. 4 is a sectional view taken along a longitudinal center line showing two components of an intermediate connecting section utilized in the method of the present invention.

It is believed that a clearer understanding of the present invention will be obtained by first describing with reference to FIG. 1 prior art pipe system 10 for which the system and method of the present invention could advantageously be used. This will be followed by an overall description of the main components of the present invention and also the method of operation of making repairs to eliminate a leak in the pipe system 10. Then there will be a more detailed description of certain specific features of the present invention.

a) Prior Art Pipe System

To describe this prior art pipe system 10, reference will initially be made both to FIG. 1 and FIG. 3. The pipe system 10 comprises a main pipe 12 having at least one branch pipe 14 (the branch pipe 14 being shown only in FIG. 1). The pipe 14 defines a passageway 16, and for purposes of description, the branch pipe 14 and the passageway 16 can be considered as having a longitudinal center axis 18 extending along the center of the pipe 14 and passageway 16.

In the following description, the term "upper" or "upward" shall denote, with reference to both FIGS. 1 and 3, a direction pointing toward the top of the first page of drawings (i.e. upwardly from the main pipe 12), or proximity thereto, and the term "lower" or "downward" shall denote the opposite direction and/or location. The term "inner or inward" would denote proximity to (or a direction toward) the longitudinal center axis 18, while the terms "outward" or "outer" would denote the opposite direction and/or location.

In the main pipe 12 there is a connecting portion 20 by which the lower end of the branch pipe 14 is connected to the main pipe 12. This connecting portion 20 is in this particular pipe system 10, shown as a socket welded branch fitting, such as a "sockolet" which is a common connector in this type of pipe system. But it could also be, for example, a half-coupling or a pipet. In the following text, this connecting portion 20 will be referred to simply as the sockolet 20. The main pipe 12, the branch pipe 10 and the sockolet 20 are all made of metal.

The sockolet 20 has a lower end portion 22 that has a frusta-conical outer surface 24 with a downward and inward taper. This frusta-conical surface 24 is welded to the main pipe 12. Extending upwardly is a surrounding side wall 28 of the sockolet 20, this side wall 28 being substantially cylindrical, but (as shown herein) with a very moderate upward and inward taper. The sockolet 20 has a vertical through opening 30 which is in the position of FIG. 1 aligned with the longitudinal axis 18. This opening 30 has a lower cylindrical surface portion 32 having a circular cross section of a smaller diameter, and an upper larger inner cylindrical side surface portion 34, also having a circular configuration with a larger diameter, with the two surfaces 32 and 34 joining at an annular upwardly facing shoulder 36. At the top end of the sockolet 20 there is an upwardly facing horizontally aligned upper annular surface 38 surrounding the upper end of the upper cylindrical surface portion 34.

With reference back to FIG. 1, it can be seen that in the existing pipe system, a lower end portion 40 of the branch pipe 14 fits snuggly into what can be considered an upper recess or socket portion 41 defined by the upper side wall 34 and the shoulder 36. The branch pipe 14 is fixedly connected to the sockolet 20 by a circumferential weld 42 which extends entirely around the interior edge of the upper sockolet surface 38 and against the adjacent lower surface portion of the branch pipe 14 adjacent to the upper sockolet surface portion 38. The lower smaller diameter part of the opening 30 is indicated at 43.

It is a common practice in fabricating the pipe system 12 for the sockolet 20 to be joined to the pipe 12 in the fabrication shop. In this environment, this connection can generally be made quite reliably. Also, the nature of the joint at which these are connected is such that a leak would seldom appear at the connection of the sockolet 20 to the main pipe 12.

On the other hand, the connection of the branch pipe 14 to the sockolet 20 is quite commonly made in the field by welding. The nature of this connection of the branch pipe 14 to the sockolet 20 is such that when a leak does occur at the branch pipe connection, it is commonly at the location of the connection of the branch pipe 14 to the sockolet 20.

With the above being given as background information, let us now turn our attention to the system and method of the present invention.

b) First Embodiment of the Present Invention

Figure 6:
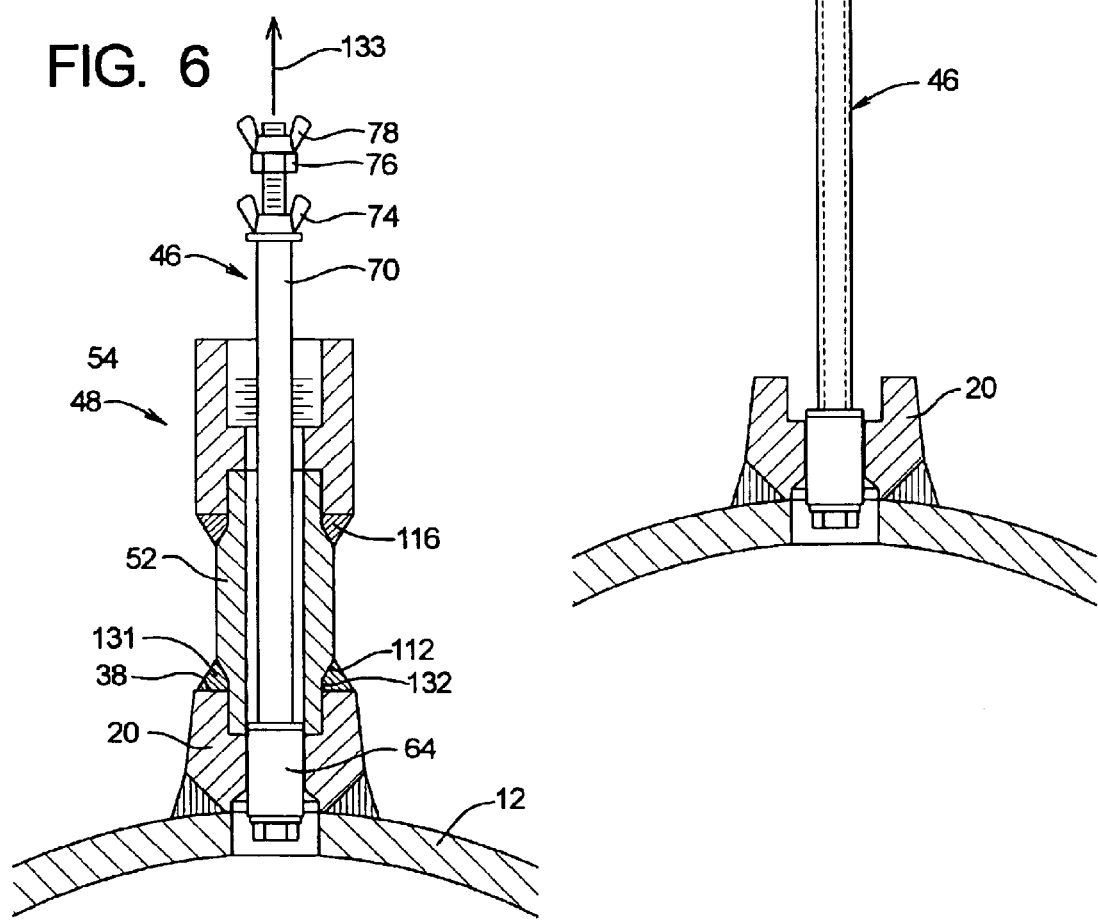
FIG. 6 is a view similar to FIG. 3, showing the plugging tool in its plugging position with the intermediate connection section positioned around the plugging tool and welded to the connecting portion of the main pipe.
Figure 7:
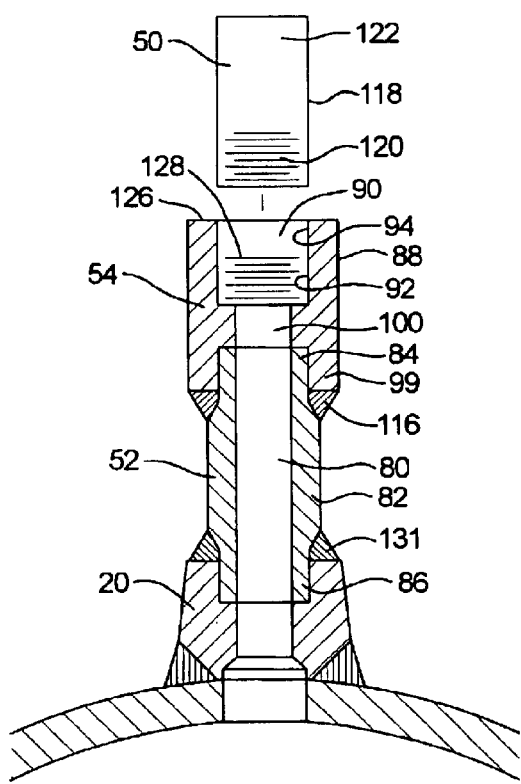
FIG. 7 is a view similar to FIG. 6, but showing the plugging tool removed, and a permanent plug being inserted into the intermediate connecting section.
Figure 8:
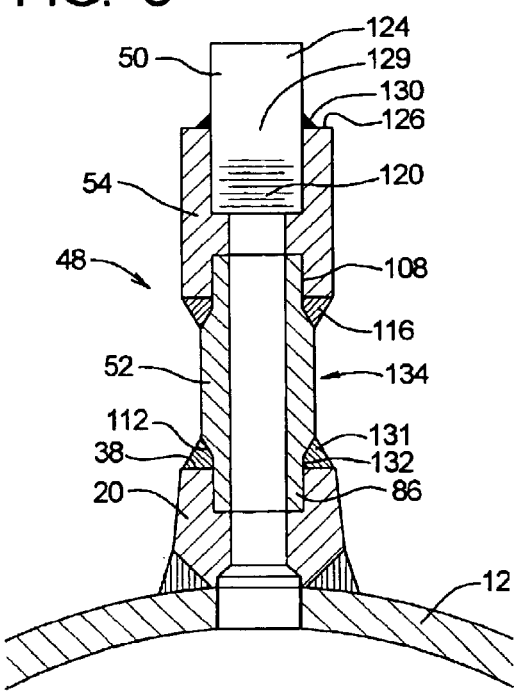
FIG. 8 is a view similar to FIG. 7, but showing the permanent plug in its plugging location of the intermediate connecting member to complete the repair of the leak.

In the system and method of the present invention, three main components are utilized, namely the plugging tool 46 (see FIGS. 2, 3, 5 and 6), the intermediate connecting section 48 (see FIGS. 4, 5, 7 and 8) and the permanent plug 50 (FIGS. 7 and 8). It should be pointed out that the intermediate connecting section 48 is in actual practice made as two separate members which are welded together, namely the lower nipple member 52 and the upper coupling 54. While it would be possible to make the intermediate connection section 48 as a single piece, it has been found to be more practical to make the connecting section 48 as the two separate members 52 and 54 and then weld these together as shown in FIG. 5. Generally the joining of the two members 52 and 54 by the weld to make these into the intermediate connecting section 48 is done prior to utilizing these in the actual repair process for eliminating the leak.

There will first be a description of the plugging tool 46, and initially reference is made to FIG. 2 which shows the separate components in its exploded view. While the plugging tool 46 has been specially designed for this particular application of the present invention, the basic design is, or may be, conventional.

With reference to FIG. 2, the plugging tool 46 comprises an elongate screw member or bolt member 56 having a downwardly positioned hex head 58 and a shank 60 extending upwardly from the head 58 and having its upper end portion threaded at 62. Then there is an elastomeric compressible cylindrical plug member 64 having a center through opening so that it fits over the shank 60. There are upper and lower washers 66 and 68 positioned immediately above and below the plug member 64, respectively, and also being positioned around the shank 60.

There is a tube member 70 having a central through opening 71 to accommodate the shank 60, and above this tube member 70 there is a top washer 72. Finally, there is a first lower wing nut 74 which is threaded onto the shank 60, a hex nut 76 that is threaded onto the upper threaded end portion 62 of the shank 60, above the wing nut 74 and as shown in FIG. 3. Then there is an upper wing nut 78 which is threaded down against the nut 76.

The nut 76 and wing nut 78 are threaded so as fit tightly against one another, and these members 76 and 78 provide a handle function by which the plugging tool can be grasped and lifted.

The basic operation of this plugging tool 46 is rather straightforward, in that the lower wing nut 74 is rotated to move the downwardly against the tube member 70 to compress the plug member axially and cause it to expand radially outwardly. Then at a later time the lower wing nut 74 is rotated to be moved upwardly to permit the plug member 64 to contract radially so that the plugging tool 46 can be removed. FIG. 3 shows the various components of FIG. 2 assembled as the plugging tool 46, in a position to be inserted into the opening 30 and specifically downwardly into the lower opening portion 43 of the sockolet 20.

Figure 5:
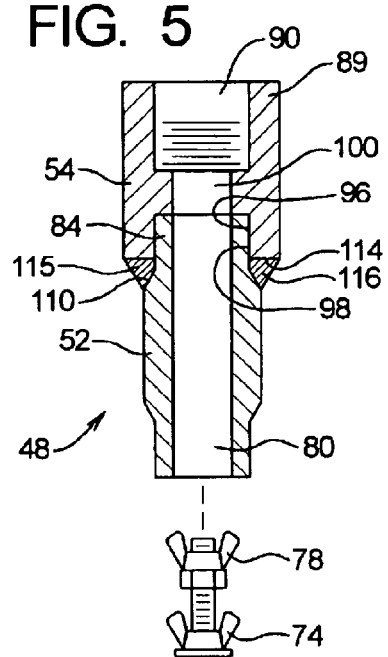
FIG. 5 is a view similar to FIG. 4, but showing the two components of the intermediate connection section welded together and in a position to be moved downwardly over the plugging tool.

Next, our attention is directed FIGS. 4 and 5 to describe the aforementioned intermediate connecting section 48. As indicated previously, this connecting section 48 actually comprises two components, namely the nipple member 52 and the upper coupling 54, which (as seen in FIG. 5) are welded together to make the single intermediate connecting section 48 (this is being done prior to disconnecting section 48 being actually used in the method of the present invention).

With reference first to FIG. 4, it can be seen that the nipple member 52 has the basic configuration of a short length of cylindrical pipe, defining a center cylindrical through passageway 80. The nipple member 52 has a central portion 82 with a greater wall thickness and having an outer cylindrical surface 83, and upper and lower end portions 84 and 86, respectively, with each of these end portions 84 and 86 having a smaller wall thickness and thus a smaller outside diameter, with outer cylindrical surfaces 85 and 87 respectively. Other features of this nipple member 52 will be described later herein.

The upper coupling 54 has an overall cylindrical configuration and thus comprises a cylindrical side wall 88. The upper portion 89 of the side wall 88 defines a cylindrical recess 90, with the lower surface portion 92 of this recess being threaded, and an upper surface portion 94 of this recess not being threaded.

The coupling 54 has a lower cylindrical recess 96 defined by a lower inside cylindrical surface 98 of a side wall portion 99 of about the same diameter of the cylindrical wall 94 defining the recess 90. There is a smaller central opening at 100, with a diameter moderately smaller than the diameter of the upper and lower recesses 90 and 96. Thus, there is formed an annular inwardly protruding center portion 102 defining an opening portion 100, and it can be seen in FIG. 4 that in a cross sectional view taken along a vertical plane cutting through the center axis, the coupling 54 has a general "H" shaped configuration. Thus there is formed a lower downwardly facing horizontally aligned annular shoulder 104, and an upper upwardly facing horizontally aligned annular shoulder 106.

When the nipple member 52 and the coupling 54 are joined together as shown in FIG. 5, the upper end portion 84 of the nipple member 52 fits snuggly within the aforementioned recess 96, so that an outer side wall portion 108 of the upper end portion 84 fits against the aforementioned inwardly facing side wall 98 of the lower recess 96 of the coupling 54.

It will also be noted that the central wall portion 82 of the nipple member 52 has at its upper and lower ends a frusta-conical transition portion, with the upwardly and inwardly slanting upper transition portion being indicated at 110 and the downwardly and inwardly slanting lower frusta-conical transition portion being indicated at 112. It will be noted, with reference to FIG. 5 that the lower annular horizontally aligned surface 114 of the coupling 54 forms with the upper frusto-conical transition surface 110 of the nipple member 52, and also with a rather short lower vertical portion of the side wall of the upper end portion 84 of the nipple member 52, a circumferential recess 115 into which the weld material 116 is deposited to form the weld connection between the nipple member 52 and the upper coupling 54.

Also, it can be seen in FIG. 5 that the passageway 80 of the nipple member 52 and the intermediate passageway portion 110 of the coupling form, in the joined position of FIG. 5 a substantially continuous passageway of a uniform cross section.

Now let us turn our attention to FIG. 7 to describe the permanent plug 50. This plug 50, like the other components, is desirably made of metal, and it has a cylindrical configuration. The side cylindrical surface 118 has a lower threaded portion 120 and an upper side surface portion 122 which is non-threaded.

In the assembly position of FIG. 8, the lower threads 120 engage the interior threads 92 of the coupling 54. It can be seen that the vertical dimension of the plug 50 is greater than the vertical dimension of the recess 90 of the coupling 54 so that in the assembled position of FIG. 8 an upper portion 124 of the permanent plug 50 is positioned above the upper top annular horizontal surface 126 of the permanent plug 50. Also, it will be noted that the upper limit of the threaded surface 92 of the upper coupling 54 (this upper end limit indicated at 128 in FIG. 7), is lower than the upper annular surface 126 of the coupling 54. When the permanent plug member 50 is in its closing position in FIG. 8, a welded material is applied, as shown at 130 around the juncture location of the upper surface 126 of the coupling 54 and the side wall surface portion of the plug 50 immediately above the annular surface 126. Thus there is an unthreaded intermediate surface portion 129 that engages the unthreaded surface portion 94 of the recess 90.

c) Method of the First Embodiment of the Present Invention

To describe now the method of the first embodiment of the present invention. Reference is first made to FIG. 1, which shows the existing prior art connection of the branch pipe 14 through the main pipe 12, utilizing the connecting member 20 which in this instance is a sockolet. As indicated previously, one of the benefits of the present invention is that the repair can be made without removing the liquid from the main pipe 12.

The first step in the method of the present invention is to separate the existing branch pipe 14 from the connection member 20. This can be accomplished by using a conventional saw and sawing into the existing weld 42 along the location of the upper planar surface 38 of the sockolet 20. The sawing is continued around the circumference of the weld 42 until the cut is made nearly all the way through around the total weld 42 and water is beginning to leak upwardly between the side surfaces 40 and 34.

As soon as this leakage begins, the branch pipe 14 is immediately removed from the sockolet 20, and the plugging tool 46, is placed in the position shown in FIG. 3, and immediately after the plugging member is moved downwardly so that the plug member 64 is inserted into the smaller diameter lower opening portion 43 of the sockolet 20. At this time, the plug member 64 is not compressed, and it is sized so that it is nearly the same diameter as the opening 43 and will fit into that opening 43. Immediately after that, the wing nut 74 is rotated to push the tube 70 downwardly against a washer 66, thus compressing the plug member 64 axially to cause the plug member to expand radially outwardly to plug the opening 43.

During that very short time period between the branch pipe 14 being removed and the plug member 64 being inserted into its plugging position and expanded, a certain amount of liquid will pass outwardly through the opening 30. This liquid that spills outwardly could be collected in some suitable manner, such as having a collecting container positioned below the main pipe 12 at the location of the branch pipe 14. Alternatively, a suitable containing member could be positioned around the location of the sockolet 20. Since the techniques for containing the outflow of liquid from the opening 30 in these situations is already known in the prior art, these will not be described in detail in this text.

With the plugging member 46 in its operative plugging position, as shown in FIG. 5, the next step is to place the intermediate connection section 48 over the plugging tool 46. In FIG. 5, the intermediate connecting member 48 is shown being positioned above the plugging tool 46, and in alignment so as to be able to move downwardly over the tool 46. It will be noted that the radial dimensions of the plugging tool 46 are slightly smaller than the internal dimensions of the openings 80 and 110 of the intermediate connecting section 48, thus permitting this connection section 48 to be readily moved downwardly around the plugging tool 46, and also for the plugging tool 46 to be removed upwardly through the connecting section 48.

As stated earlier in this text, the two components 52 and 54 which are interconnected to make the intermediate connecting member 48 are pre-assembled and welded so that these function as a unitary structure. Also, as indicated previously, it would be possible to fabricate these into one integral piece, but for practical reasons has been found more efficient and also quite satisfactory to form these two components (the nipple member 52 and the upper coupling 54) as separate members and have these welded prior to being used during the leak repairing operation.

From the position of FIG. 5, the intermediate connection section 48 is moved downwardly to the position of FIG. 6 where the lower end portion 86 of the nipple member 52 is positioned in the upper socket portion 41 of the passageway 30.

With the intermediate connection section 48 being in the position of FIG. 6, and with the plugging tool 46 still in its plugging position of FIG. 6, the intermediate connecting section 48 is welded to the sockolet 20 by applying the weld material 131 to the recessed area immediately above the horizontal annular surface 38, adjacent to the fursto-conical transition portion 112 of the nipple member 52, and also adjacent to the very short exposed surface section 132 of the cylindrical wall of the nipple member end portion 86.

With this welding operation of the nipple member 52 to the sockolet 20 being completed, the next step is to remove the plugging tool 46 from its plugging position of FIG. 6, by first rotating the wing nut 74 to permit the plug member 64 to expand axially, and thus contract radially. Then the plugging tool 46 is raised upwardly in the direction indicated by the arrow in FIG. 6. The water which passes out the sockolet opening 32 is, as indicated earlier, collected in a manner already known in the prior art.

As soon as the plugging tool 46 is removed totally out of the intermediate connecting section 48, the permanent plug 50 is then inserted into the upper cylindrical recess 90 of the upper coupling 54 of the intermediate connecting section 48. In FIG. 7, the permanent plug 50 is shown in a position, above, and in alignment with the recess 90. In FIG. 8, the permanent plug 50 has been moved downwardly into the recess 90, with the plug 50 then being rotated to cause it to be threaded into the recess 90 moved downwardly to its lowermost plugging position.

After this is accomplished, then the aforementioned weld material 130 is applied to the area at the upper annular horizontal surface 126 of the upper connecting member 54 and the side wall portion of the upper plug portion 124 immediately adjacent to the surface 126. With this being accomplished, the passageways 80 and 100 are closed, and the three welds at 116, 130 and 131 ensure that there is no leak from the sockolet 20, the intermediate connecting section 48 or the permanent plug 50. The overall structure shown in FIG. 8 which repairs the leak and closes off the branch passageway 30 is given the general numerical designation of 134. The characteristics of this end leak repair structure 134 will be discussed further later in this text.

d) Second Embodiment of the Present Invention

Figure 9:
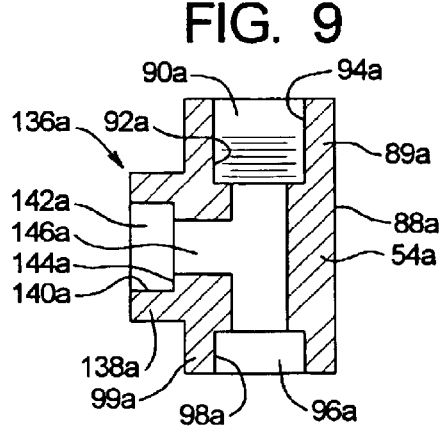
FIG. 9 is a sectional view along a longitudinal center line of a coupling member used in a second embodiment of the present invention.
Figure 10:
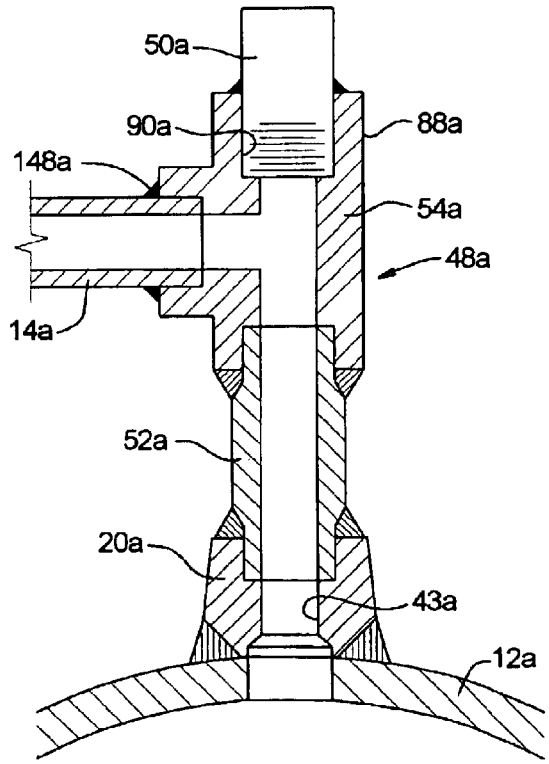
FIG. 10 is a view similar to FIG. 8, but showing the coupling member of FIG. 9 used in the method of the second embodiment and in place of the location of the completed leak repair structure.

Reference is now made to FIGS. 9 and 10 which show a second embodiment of the present invention. Components of this second embodiment which are similar to components of the first embodiment will be given like numerical designations with an "a" suffix distinguishing those of the second embodiment.

The first embodiment of the present invention which is described in the earlier text is a method for repairing a leak at the connection the branch pipe connection 14 in a manner that the outlet from the main pipe 12 is closed off. In other instances, it is desired to repair the leak and yet leave the branch passageway open. This is accomplished by the second embodiment of the present invention.

In this second embodiment, there is the same existing prior art pipe system where there is the main pipe 12a, the branch pipe (not shown in FIGS. 9 and 10) and the sockolet 20a welded to the main pipe 12a. There is also the pipe nipple member 52a and the permanent plug 50a, both of these having the same construction and basically the same function as in the first embodiment. However, the upper coupling member 54a of this second embodiment, while providing basically the same functions as the coupling 54 of the first embodiment, that has an added function of making a connection to the existing branch connection.

This upper special Tee of the second embodiment is given the general designation of 54a and has all of the main components of the coupling 54 of the first embodiment. Thus, there is the cylindrical side wall 88a, an upper wall portion 89a defining the recess 90a. This recess 90a in turn has the lower threaded surface portion 92a and the upper non-threaded surface portion 94a. Further, there is a lower wall portion 99a having an interior cylindrical surface 98a defining a lower cylindrical recess 96a.

In addition to having those main components of the coupling 54 of the first embodiment, the special Tee member 54a has a "T" shaped configuration with a T forming portion 136a which is formed integrally with and extends laterally outwardly from the cylindrical wall 88a. This T portion 136a comprises a cylindrical side wall 138a defining with an interior cylindrical surface 140a defining a recess or socket portion 142a. The side wall 138a is arranged so that there is an annular laterally facing surface portion 144a in the form of a shoulder or step 144a, and leading radially inwardly from that shoulder 144a there is a reduced diameter opening portion 146a.

To describe now the method of the second embodiment, in reciting the initial steps of the second embodiment, we will for the moment disregard the presence of the T shaped portion 136a of the upper connecting member 54a.

The first several steps as shown in FIGS. 1–6 are performed in the same way as in the first embodiment, except that the plugging tool 46 has not as yet been removed from its plugging position where it plugs the lower opening portion 43a. Rather, the plugging tool 46 is kept in its plugged position and then a branch pipe 14a (indicated in FIG. 10) is moved into the recess 142a, and a weld connection is made at 148a.

The branch pipe 14 shown in FIG. 1 extends along the longitudinal center access 18 of FIG. 1. In this instance, the branch pipe 14a that is to replace the pipe 14 that was originally removed from the sockolet 20a extends at 90° to that longitudinal axis 18 as shown in FIG. 1. Thus, to have the newly added pipe 14a serve the same function as the original pipe 14, there would possibly be provided an elbow connection or some other configuration so that the connection in the existing pipe system can be made.

Then with the pipe section 14a in place and the weld made at 148a, the plugging tool 46 is removed from its locking position within the intermediate connecting section 48a and the permanent plug 50a is quickly inserted into the upper recess 90a and threaded into its engaged position and welded as shown in FIG. 10. This is accomplished in the same manner as in the first embodiment.

With this being accomplished, the repair of the leak is accomplished, and also the connection is made to the existing branch pipe, by means of the pipe section 14a connecting into the T connection 136a.

e) Third Embodiment of the Present Invention

A third embodiment of the present invention will now be described with reference to FIGS. 11–13. In some instances, after the branch pipe 14 is removed from the sockolet 20, there is a delay in utilizing the plugging tool 46 in plugging the opening 43 of the connecting portion 20. Accordingly, in this third embodiment there is provided a temporary plug 160 (or contingency plug) which has three plug portions, namely a lower plug portion 162 of a smaller diameter, an intermediate plug portion 164 of an intermediate diameter, and a third top plug portion 166 of the largest diameter.

The lower plug portion 162 is sized to fit within the lower opening portion 43 of the main pipe connecting portion 20; the intermediate plug portion 164 fits snugly within the socket portion 41 of the opening 30; and the upper plug portion 168 has a diameter sufficiently large so that a downwardly facing circumferential shoulder 168 is able to bear against the upwardly facing horizontally aligned annular surface 38 of the sockolet 20. This downwardly facing annular surface 168 has an O-ring seal 169. Also, a downwardly facing annular surface portion 170 located at the bottom side of the intermediate plug portion 164 also has an O-ring seal 172.

In operation, after the branch pipe 14 is removed from the sockolet opening 30, the contingency plug 160 is inserted into the opening 30, with the intermediate portion 164 and the lower portion 162 fitting snugly into their respective opening portions 41 and 43 of the opening 30. Then the circumferential seal 168 of the upper plug portion is pressed against the aforementioned upwardly facing annular surface 38 of the sockolet 20, and the seal 172 bears against the shoulder 36.

To apply the downward pressure to the plug 160, there is provided a circumferential band (come-a-long) as indicated at 174 which encircles the main pipe 12 and is tightened in a conventional manner to cause a downward force against the plug member 160. The upper surface 176 of the plug member 160 has a diametrically aligned shallow slot 178 to receive the tension member 174 and properly locate the tension member 174 relative to the plug 160.

f) Various Feature of the Present Invention

Earlier in this text, it was indicated that there would be a discussion of some of the advantages of the arrangement of the present invention. Further, as indicated earlier, one of the problems with the type of branch pipe connections described above, and also with the problems of providing repairs to the leaks that have been developed, is that with continued vibration in various industrial applications, or by the imposition of other loads, the structure of the components is weakened, and susceptible to the forming of fatigue cracks. As these cracks grow with continued vibration and/or other forces imposed, these develop into leaks.

One of the significant benefits of the present invention is that it has been designed to meet the strictest standards imposed by (ASME: American Society of Mechanical Engineers, and ANSI: American National Standard Institute) so as not to become damaged even in the more extreme industrial applications. It will be noted, in viewing the end structure of the first embodiment, as shown in FIG. 8, that there are four separate components which are joined together at three connections. First, there is the sockolet 20 and the nipple member 52 which are joined at the weld connection 131. Second the nipple member 52 and the upper coupling 54 are joined at the weld connection 116. Finally, the upper coupling 54 and the permanent plug 50 are joined together at the weld connection 130.

When two metal pieces are welded together, the heat from the weld imposes stresses on the metal members being welded, and this can induce stresses in the interior structure of these components in the area of the weld. This problem is exacerbated when it is attempted to make the weld where there is liquid (e.g. water) inside one or more of the components (e.g. a pipe and a connector) when the weld is being made, because of the temperature differential imposed across the components. Thus, one of the advantages of the present invention is that it enables the repair to be made conveniently without requiring the main pipe that is at the location of the connection to have the water drained from the main pipe while the repair is being made.

However, beyond this, the design of the present invention is arranged to alleviate the problem of fatigue cracks or other structural damage occurring in the end structure by which the area of the leak is repaired. This is due in large part to the special design of member 52 and its end weld configuration.

In explaining certain features of the present invention, it will be indicated that certain dimensional relationships are significant.

Figure 14A:
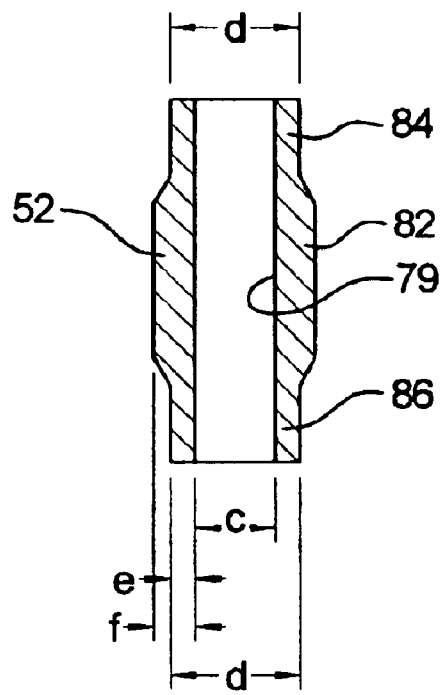
FIG. 14A is a sectional view of the nipple member by itself.
Figure 14B:
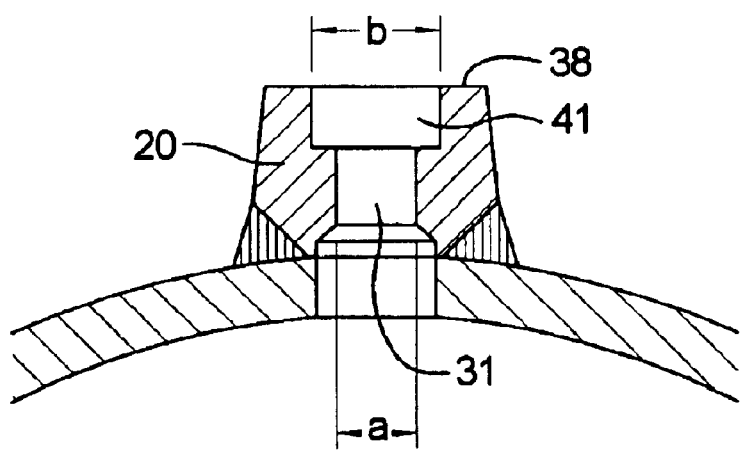
FIG. 14B is a sectional view similar to FIG. 1, but only showing the branch pipe, and the sockolet.
Figure 15:
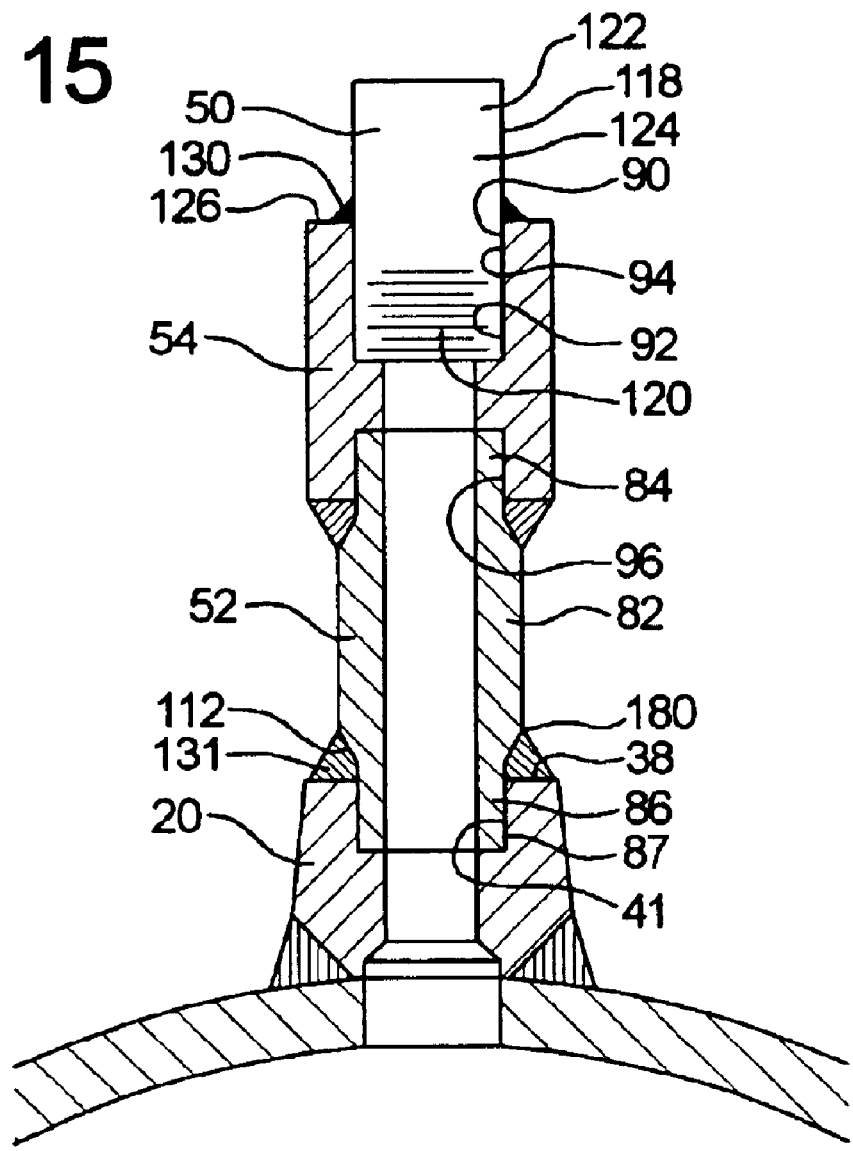
FIG. 15 is a sectional view showing the components welded together to form one closing structure.

Let us begin by examining first the FIGS. 14A and 14B, with 14A showing the nipple member 52, and FIG. 15 showing the sockolet 20. After the existing branch pipe 14 is removed and the plug member 64 of the plugging tool 46, the plug member 64 is moved into the opening portion 43 of the sockolet opening 31. As a practical matter the diameter of the plug member 64 must be in its non-compressed condition no greater than (or slightly smaller than) the diameter of the opening 43 (indicated at "a" in FIG. 14B). Since the sockolet 20 is already part of the main pipe, this dictates the size of the diameter of the plug 64. Also, the size of the upper socket portion 41 (indicated at "b" in FIG. 14B) is already dictated by the configuration of the sockolet 20.

Accordingly, the lower end portion 86 of the nipple member 82 has an inside diameter (indicated at "c" in FIG. 14A) substantially the same size as the diameter "a" of the lower opening portion 43 of the sockolet 20 and an outside diameter "d" that closely matches the inside diameter of the socket 41 (indicating at "b" in FIG. 14B) of the sockolet 20. This in turn dictates the radial wall thickness (of the lower end portion 86 of the nipple member 82). This radial wall thickness is indicated at "e" in FIG. 14A. Further, we note that the radial thickness dimension "f" of the middle portion 82 of the nipple member 52 is greater than the radial thickness "e" of the cylindrical wall portion forming the end portion 86 of the nipple member 52.

Now let us turn our attention to FIG. 15 which shows the four components (sockolet 20, nipple member 52, upper coupling 54 and permanent plug 50) all welded together to form one closing structure. In viewing FIG. 15 it can be seen that the weld 131 is adjacent on its lower surface portion to the annular upwardly facing surface 38 of the sockolet 20, also adjacent to the downwardly and inwardly sloping transition portion 112, just above the lower end portion 86 of the nipple member 52, and also against that portion of the outside wall 87 of the lower end portion 86 that is above the location of the surface 38 and below the lower edge of the transition surface 112.

In examining this weld 131 connection, it can readily be seen that the outside surface 87 of the lower portion 86 of the nipple member 52 makes a relatively smooth transition at the transition surface 112 and then also a smooth transition upwardly back to the outer cylindrical surface of the middle section 82, avoiding sharp inside and/or outside edges. Further, the vertical distance between the top edge portion of the 180 transition surface 112 and the lower positioning surface 38 is not large so that when the weld material is placed in the recess formed by these members 52 and 20, the weld 131 fills in the entire area between the upper part of the transition surface 112 down to the outer edge of the upper outer edge of the surface 38.

The weld 131 fills this recess in a manner to provide overall smooth transitions and added material to add structural strength to this juncture area immediately above the sockolet 20. This particular area where the weld 131 is located is, when we look at the prior art sockolet connection of FIG. 1 an area where historically cracks have developed, with these resulting in leaks. The testing that has been done on this first embodiment of the present invention indicates that the connection that is made in accordance with the present invention (as shown in FIGS. 8 and 10) has reduced significantly (and as a practical matter substantially eliminated) the development of fatigue cracks in this area.

With reference to FIG. 15, it can be seen that the configuration of the weld 116 and the surfaces in contact with the weld 116 are substantially the same as those of the weld 131.

Also as indicated earlier, the nipple member 52 is formed symmetrically so that either end portion 84 or 86 could function as the lower or upper end portion. Thus, it will be readily recognized that with inserting the upper end portion 84 of the nipple member 52 into the lower recess or socket 96 of the coupling member 54, we have essentially the same structure as joining the lower end member 86 into the socket portion 41 of the sockolet 20.

Accordingly, substantially the same connection is made between the upper portion of the nipple member 52 with the coupling member 54 as is made between the lower portion of the nipple member 52 with the sockolet 20. It can readily be seen by looking at FIG. 8, and also FIG. 15 applies to the weld 116 between the nipple member 52 and the coupling member 54.

Next, we come to the connection between the coupling member 54 and the permanent plug 50. It will be noted that the lower portion 92 of the recess 90 in the top part of the coupling 54 is threaded, and the inner surface portion 94 immediately above the threaded portion 92 is a flat cylindrical surface. In like manner, the permanent plug member 50 has a lower cylindrical surface portion 120 which is threaded, and the vertical dimension of this threaded surface portion 120 is substantially the same as that of the interior threaded surface portion 92 of the recess 90. The upper cylindrical surface portion 122 of the cylindrical surface 118 of the permanent plug 50 is a flat cylindrical surface. Also, it will be noted that the upper cylindrical flat portion 122 in the assembled position of FIG. 8 extends above the upper annular horizontal surface portion 126 of the coupling 54.

It will be noted that the weld 130 is placed at the juncture of the upper horizontal annular surface 126 of the coupling 54 and that portion of the flat cylindrical surface portion 124 which is immediately above the surface 126. Further, the upper end portions of the threaded surfaces 92 and 120 are spaced below the location of the weld 130 by at least a quarter of an inch and could up to about one half an inch or possibly greater. Further, depending on various design factors this distance could conceivably be 0.1, 0.15, 0.2, 0.25, 0.3, 0.35, 0.4, 0.45, 0.5 inch or greater. It has been found that this arrangement alleviates the tendency of fatigue cracks to form in this area.

It will readily be recognized that this same analysis concerning the beneficial features of the present invention would apply just as well to the second embodiment shown in FIGS. 9 and 10. It will also be noted that the juncture between the lateral pipe 14a (see FIG. 10) to the cylindrical side wall portion 138 has a weld 148a in a manner similar to the weld 130 of FIG. 8.

It is to be recognized that various modifications could be made to the present invention without departing from the basic teachings thereof.

I claim:

1. A method of repairing a leak in a pipe assembly which comprises a main pipe with a main pipe wall having a main pipe connecting portion with a main pipe through opening, and a branch pipe connecting to the main pipe at the through opening, said method comprising:
   a) separating the branch pipe from the main pipe;
   b) providing a plugging tool with a plug portion and a plugging tool extension, and inserting the plug portion into the main pipe through opening;
   c) providing an intermediate connecting section which has a through passageway and a connecting end portion, positioning the intermediate connecting section so that the plugging tool extension is located in the through passageway of the intermediate connecting section and positioning the connecting end portion at least partly in interfitting relationship with the main pipe connecting portion at the main pipe through opening;
   d) joining the connecting end portion of the intermediate connecting section to the connecting portion of the main pipe;
   e) removing the plug portion from the through opening of the connecting portion; and
   f) inserting a closure member into the through passageway of the intermediate connecting section.

2. The method as recited in claim 1, wherein with said plug member being inserted into the through opening of the main pipe connecting portion, said method further comprising manipulating said extension member to expand the plug member in the through opening of the main pipe connecting portion, and subsequently again manipulating said extension member to collapse said plug portion to then withdraw the plug portion from the through opening.

3. The method as recited in claim 1, wherein said main pipe through opening of the main pipe connecting portion comprises a first smaller diameter opening of a smaller diameter closer to a center location of said main pipe, and a second larger diameter opening portion positioned further from the center location of said main pipe, said method further comprising inserting said plug member into the first opening portion of the through opening, and positioning the connecting end portion of the intermediate connecting section into the second opening portion of said through opening of the connecting portion.

4. The method as recited in claim 3, wherein said main pipe connecting portion of the main pipe has an annular surface facing generally outwardly from the center location of the main pipe and surrounding the second larger diameter of opening portion, said method further comprising applying a bonding agent at a circumferential location of said annular surface and at an adjacent surrounding surface portion of the connecting end portion of the intermediate connecting section.

5. The method as recited in claim 4, wherein said bonding agent is a weld material which is applied circumferentially to the annular surface portion and also to the adjacent surface portion of the connecting end portion.

6. The method as recited in claim 5, wherein said intermediate connecting section has a second connecting end portion and a central connecting portion between the connecting end portion and the second connecting end portion, said connecting end portion having a wall thickness of a first smaller thickness dimension, and said central connecting portion having a wall thickness dimension of a second greater thickness dimension at a location adjacent to said annular surface of the main pipe connecting portion, said annular surface of the main pipe connecting portion and an adjacent surface portion of the central connecting portion forming a circumferential recess in which the bonding agent is placed.

7. The method as recited in claim 6, wherein there is a slanted transition surface portion arranged to extend circumferentially around a lower end portion of said central connecting portion and slanting radially inwardly from the central connecting portion to the connecting end portion and the bonding agent, in being applied to said circumferential recess, is applied at said transition surface in joining said intermediate connecting portion to said main pipe connecting portion.

8. The method recited in claim 7, wherein said bonding agent is a weld material which is applied circumferentially also to an adjacent annular surface portion of said main pipe connecting portion.

9. The method as recited in claim 1, wherein said plug portion is removed from the main pipe through opening and outwardly through the through passageway of the intermediate connecting section, said method further comprising placing the closure member in the through passageway at a second end portion of the intermediate connecting section to block liquid flow through the passageway of the intermediate connecting section.

10. The method as recited in claim 9, wherein the second connecting end portion of the intermediate connecting section has a generally cylindrical outer end recess to receive the closure member, and said closure member has a threaded connection in said recess.

11. The method as recited in claim 10, wherein said second connecting end portion of the intermediate connecting section has an outer end annular surface surrounding the outer end recess of the second end portion, and said outer end annular surface faces outwardly from a center location of said main pipe, said closure member extending outwardly beyond said outer annular as an outer generally cylindrical closure portion adjacent to said outer end annular recess, said method further comprising applying a bonding material to said outer end annular surface and also to an adjacent surface portion of outer generally cylindrical closure portion.

12. The method as recited in claim 11, wherein said bonding agent is a weld material.

13. The method as recited in claim 12, wherein there is a threaded connecting portion of the cylindrical recess spaced toward the center location of the main pipe from the outer end annular surface of the second connecting end portion so that there is a substantially flat cylindrical surface portion of said outer end recess at the second connecting end portion which is adjacent to said outer end annular surface surrounding the outer end recess of the second connecting end portion and extending therefrom to said threaded connecting portion.

14. The method as recited in claim 1, wherein the intermediate connecting portion has a central connecting portion between first and second connecting end portions and said first connecting end portion has a smaller wall thickness relative to a greater wall thickness of an adjacent portion of the central connecting portion of the intermediate connecting section, and there is a transition circumferential wall portion connecting the first connecting end portion to the central connecting portion of the intermediate connecting section, said transition circumferential wall portion increasing in thickness from the first connecting end portion to the adjacent portion of the central connecting portion of the intermediate connecting section.

15. The method as recited in claim 14, wherein the passageway of the intermediate connecting portion has a substantially uniform cross section, and that portion of the passageway of the intermediate connecting section that is at the transition circumferential wall portion has a generally cylindrical configuration, and an outer surface portion around the transition circumferential wall portion has a generally frusta-conical wall configuration.

16. The method as recited in claim 1, wherein said intermediate connecting section comprises a first connecting subsection which comprises a central subsection connecting portion having first and second central subsection end portions, and a first subsection connecting end portion connected to said first central subsection connecting end portion, and further comprising a second subsection connecting end portion connected to the second central subsection end portion, said first connecting subsection end portion and said second subsection connecting end portion each having a thickness dimension which is less than a thickness dimension of said central subsection connecting end portion, and each of said first subsection connecting end portion and said second subsection connecting end portion connecting to the central subsection connecting portion at respective first and second transition connecting portions, each transition connection portion having a slanted transition surface slanting radially outwardly toward the central subsection connecting portion, said method further comprising welding said intermediate connecting section to said main pipe connecting portion by applying a weld material at the location of said the transition surface of the first transition connecting portion, and also connecting said second connecting end portion to a second outer connecting subsection of said intermediate connecting section by applying a weld material at said transition surface of the second connecting end portion.

17. The method as recited in claim 16, wherein said second outer connecting subsection connects to said closure member with the closure member extending into a connecting recess of the outer connecting subsection.

* * * * *